United States Patent
Nagata et al.

(10) Patent No.: US 11,769,892 B2
(45) Date of Patent: Sep. 26, 2023

(54) FUEL CELL SYSTEM

(71) Applicant: HONDA MOTOR CO., LTD., Tokyo (JP)

(72) Inventors: Daiki Nagata, Tokyo (JP); Akiji Ando, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 51 days.

(21) Appl. No.: 17/673,923

(22) Filed: Feb. 17, 2022

(65) Prior Publication Data

US 2022/0311033 A1  Sep. 29, 2022

(30) Foreign Application Priority Data

Mar. 29, 2021 (JP) .................................. 2021-054623

(51) Int. Cl.
*H01M 8/04746* (2016.01)
*H01M 8/04029* (2016.01)
*H01M 8/04858* (2016.01)
*H01M 8/0432* (2016.01)
*H01M 8/04007* (2016.01)

(52) U.S. Cl.
CPC ... *H01M 8/04768* (2013.01); *H01M 8/04029* (2013.01); *H01M 8/0432* (2013.01); *H01M 8/04074* (2013.01); *H01M 8/0494* (2013.01); *H01M 2250/20* (2013.01)

(58) Field of Classification Search
CPC ........... H01M 8/04029; H01M 8/0432; H01M 8/0494; H01M 8/04768
See application file for complete search history.

(56) References Cited

U.S. PATENT DOCUMENTS

2007/0026281 A1* 2/2007 Ueda ................. H01M 8/04029
                                                          429/513
2010/0203410 A1  8/2010 Ueda et al.

FOREIGN PATENT DOCUMENTS

| JP | 2005322527 A | 11/2005 |
| JP | 2007035480 A | 2/2007 |
| JP | 2007122962 A | 5/2007 |
| JP | 2007265774 A | 10/2007 |

(Continued)

OTHER PUBLICATIONS

Notice of Reasons for Refusal for Japanese Patent Application No. 2021-054623 dated Oct. 18, 2022; 8 pp.

*Primary Examiner* — Brittany L Raymond
(74) *Attorney, Agent, or Firm* — Armstrong Teasdale LLP

(57) ABSTRACT

A fuel cell system mounted on a vehicle includes: a fuel cell stack; a refrigerant circulation passage connected to the fuel cell stack; a refrigerant circulation pump arranged in the refrigerant circulation passage and configured to circulate a refrigerant; and a controller configured to control a power generation amount of the fuel cell stack according to a request driving force of the vehicle and control the refrigerant circulation pump. The controller is configured to set a rotational speed of the refrigerant circulation pump within a range equal to or lower than a rotational speed upper limit based on a temperature of the fuel cell stack, and the controller sets the rotational speed upper limit lower at a time a vehicle speed is equal to or lower than a stop determination value as compared with a time the vehicle speed is higher than the stop determination value.

3 Claims, 5 Drawing Sheets

(56)     References Cited

FOREIGN PATENT DOCUMENTS

Figure 1:
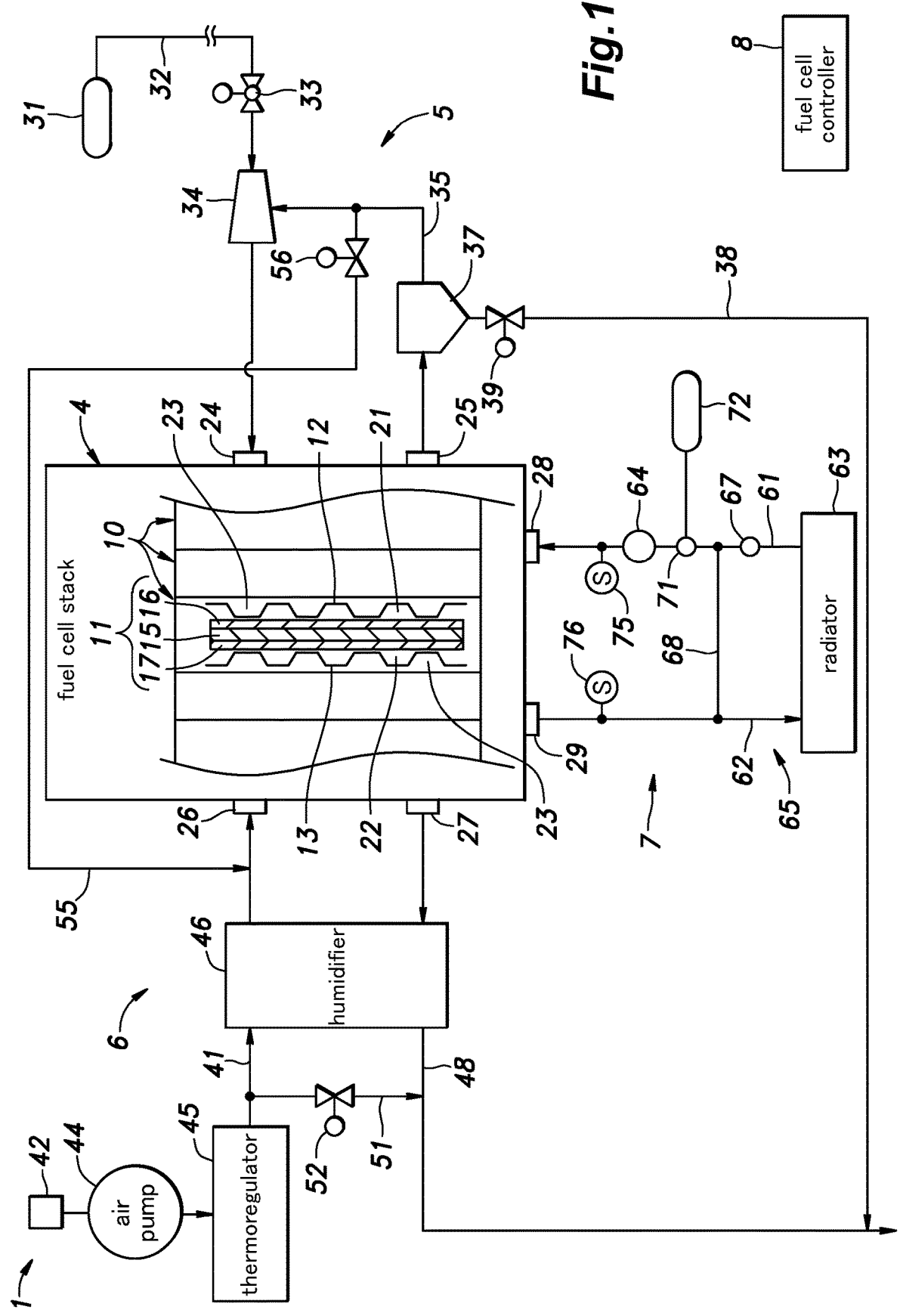

| | | | |
|---|---|---|---|
| JP | 2009199940 | A | 9/2009 |
| JP | 2011150824 | A | 8/2011 |
| JP | 2012-099237 | * | 5/2012 |
| JP | 2012099237 | A | 5/2012 |
| JP | 2013218960 | A | 10/2013 |
| JP | 2014232636 | A | 12/2014 |
| JP | 2017084665 | A | 5/2017 |
| WO | 2013076785 | A1 | 5/2013 |

* cited by examiner

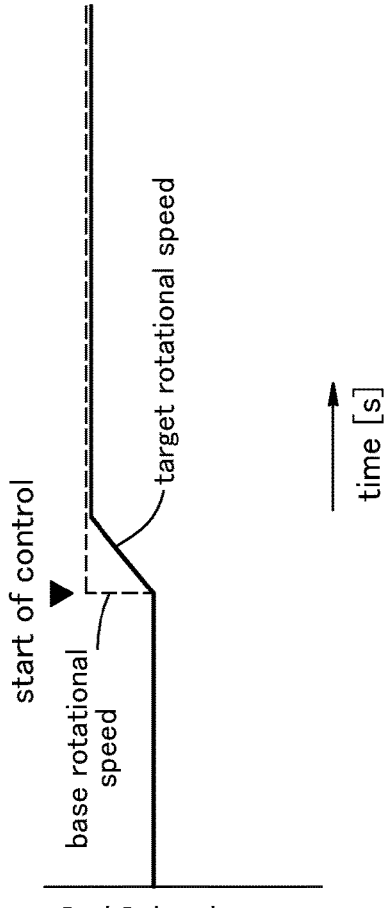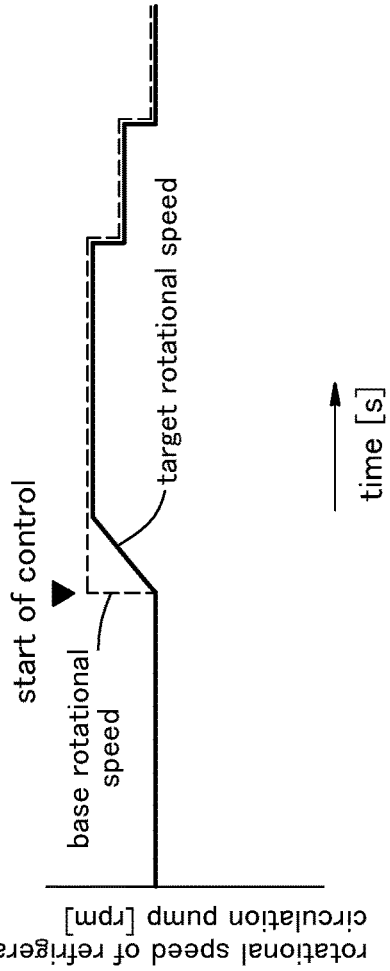

FUEL CELL SYSTEM

TECHNICAL FIELD

The present invention relates to a fuel cell system mounted on a vehicle.

BACKGROUND ART

JP2017-84665A discloses a fuel cell system including a circulation passage connected to fuel cells, a pump that circulates cooling water through the circulation passage, a radiator that causes the cooling water to emit heat, and a reserve tank connected to the circulation passage via a water flow rate regulation valve. In such a fuel cell system, when a discharge amount of the pump becomes greater than a circulating water amount including a supply amount from the reserve tank, the pressure at a pump inlet drops. Accordingly, cavitation may occur in the pump, and the circulation passage, which is made of an elastic material such as rubber and resin, may be deformed and narrowed. In order to solve these problems, the fuel cell system according to JP2017-84665A estimates the insufficiency of the cooling water in the circulation passage, and drives the pump at a prescribed forcible inflow rotational speed so that the pressure of the cooling water at the pump inlet becomes equal to the inflow pressure of the water flow rate regulation valve upon determining that the cooling water is insufficient.

However, the ability to cool the fuel cells may become excessive or insufficient when the rotational speed of the pump is controlled based on not the temperature of the fuel cells but the pressure of the cooling water at the pump inlet. Further, depending on the traveling state of the vehicle, the pump is more likely to be driven at the forcible inflow rotational speed, and thus the temperature of the fuel cells may become unstable.

SUMMARY OF THE INVENTION

In view of the above background, an object of the present invention is to provide a fuel cell system that can suppress the negative pressure generated at a pump inlet and stabilize the temperature of a fuel cell stack.

To achieve such an object, one aspect of the present invention provides a fuel cell system (1) mounted on a vehicle (2), comprising: a fuel cell stack (4); a refrigerant circulation passage (65) connected to the fuel cell stack, a refrigerant being configured to circulate through the refrigerant circulation passage; a refrigerant circulation pump (64) arranged in the refrigerant circulation passage and configured to circulate the refrigerant; a reserve tank (72) connected to the refrigerant circulation passage via a regulation valve (71); a vehicle speed sensor (83) configured to acquire a vehicle speed of the vehicle; a temperature acquiring unit (75, 76) configured to acquire a temperature of the fuel cell stack; and a controller (8) configured to control a power generation amount of the fuel cell stack according to a request driving force of the vehicle and control the refrigerant circulation pump, wherein the controller is configured to set a rotational speed of the refrigerant circulation pump within a range equal to or lower than a rotational speed upper limit based on the temperature of the fuel cell stack, and the controller sets the rotational speed upper limit lower at a time the vehicle speed is equal to or lower than a stop determination value as compared with a time the vehicle speed is higher than the stop determination value.

According to this aspect, when the vehicle speed is equal to or lower than the stop determination value, the rotational speed of the refrigerant circulation pump is suppressed, and the pressure at a pump inlet (an inlet of the refrigerant circulation pump) is prevented from decreasing. When the vehicle speed is equal to or lower than the stop determination value, it is estimated that the power generation amount of the fuel cell stack decreases and thus the temperature of the fuel cell stack decreases. Accordingly, even if the rotational speed of the refrigerant circulation pump is suppressed, the temperature of the fuel cell stack is prevented from increasing. Accordingly, it is possible to provide a fuel cell system that can suppress the negative pressure generated at the pump inlet and stabilize the temperature of the fuel cell stack.

In the above aspect, preferably, in a case where the temperature of the fuel cell stack is equal to or higher than a prescribed temperature threshold, the controller sets the rotational speed upper limit lower at a time the power generation amount of the fuel cell stack is equal to or less than a prescribed power generation threshold as compared with a time the power generation amount of the fuel cell stack is more than the power generation threshold.

According to this aspect, when the power generation amount of the fuel cell stack is equal to or less than the power generation threshold, the rotational speed of the refrigerant circulation pump is suppressed, and the pressure at the pump inlet is prevented from decreasing. When the power generation amount of the fuel cell stack is equal to or less than the power generation threshold, it is estimated that the temperature of the fuel cell stack decreases. Accordingly, even if the rotational speed of the refrigerant circulation pump is suppressed, the temperature of the fuel cell stack is prevented from increasing.

In the above aspect, preferably, the controller sets an upper limit of an increasing speed of the rotational speed of the refrigerant circulation pump lower at the time the vehicle speed is equal to or lower than the stop determination value as compared with the time the vehicle speed is higher than the stop determination value.

According to this aspect, when the vehicle speed is equal to or lower than the stop determination value, the increasing speed of the rotational speed of the refrigerant circulation pump is suppressed, and the pressure at the pump inlet is prevented from decreasing. When the vehicle speed is equal to or lower than the stop determination value, it is estimated that the power generation amount of the fuel cell stack decreases, and thus the temperature of the fuel cell stack decreases. Accordingly, even if the increasing speed of the rotational speed of the refrigerant circulation pump is suppressed, the temperature of the fuel cell stack is prevented from increasing.

In the above aspect, preferably, in a case where the fuel cell stack stops power generation and the temperature of the fuel cell stack is equal to or lower than a prescribed low temperature threshold, the controller executes low temperature period control to drive the refrigerant circulation pump at a prescribed low temperature period rotational speed, and in the low temperature period control, the controller sets an increasing speed of the rotational speed of the refrigerant circulation pump lower than an upper limit of the increasing speed of the rotational speed of the refrigerant circulation pump at the time the vehicle speed is higher than the stop determination value.

According to this aspect, when the fuel cell stack stops power generation, the increasing speed of the rotational speed of the refrigerant circulation pump is suppressed, and the pressure at the pump inlet is prevented from decreasing. When the fuel cell stack stops power generation, it is estimated that the temperature of the fuel cell stack decreases. Accordingly, even if the increasing speed of the rotational speed of the refrigerant circulation pump is suppressed, the temperature of the fuel cell stack is prevented from increasing.

Thus, according to the above aspects, it is possible to provide a fuel cell system that can suppress the negative pressure generated at a pump inlet and stabilize the temperature of a fuel cell stack.

BRIEF DESCRIPTION OF THE DRAWING(S)

Figure 2:
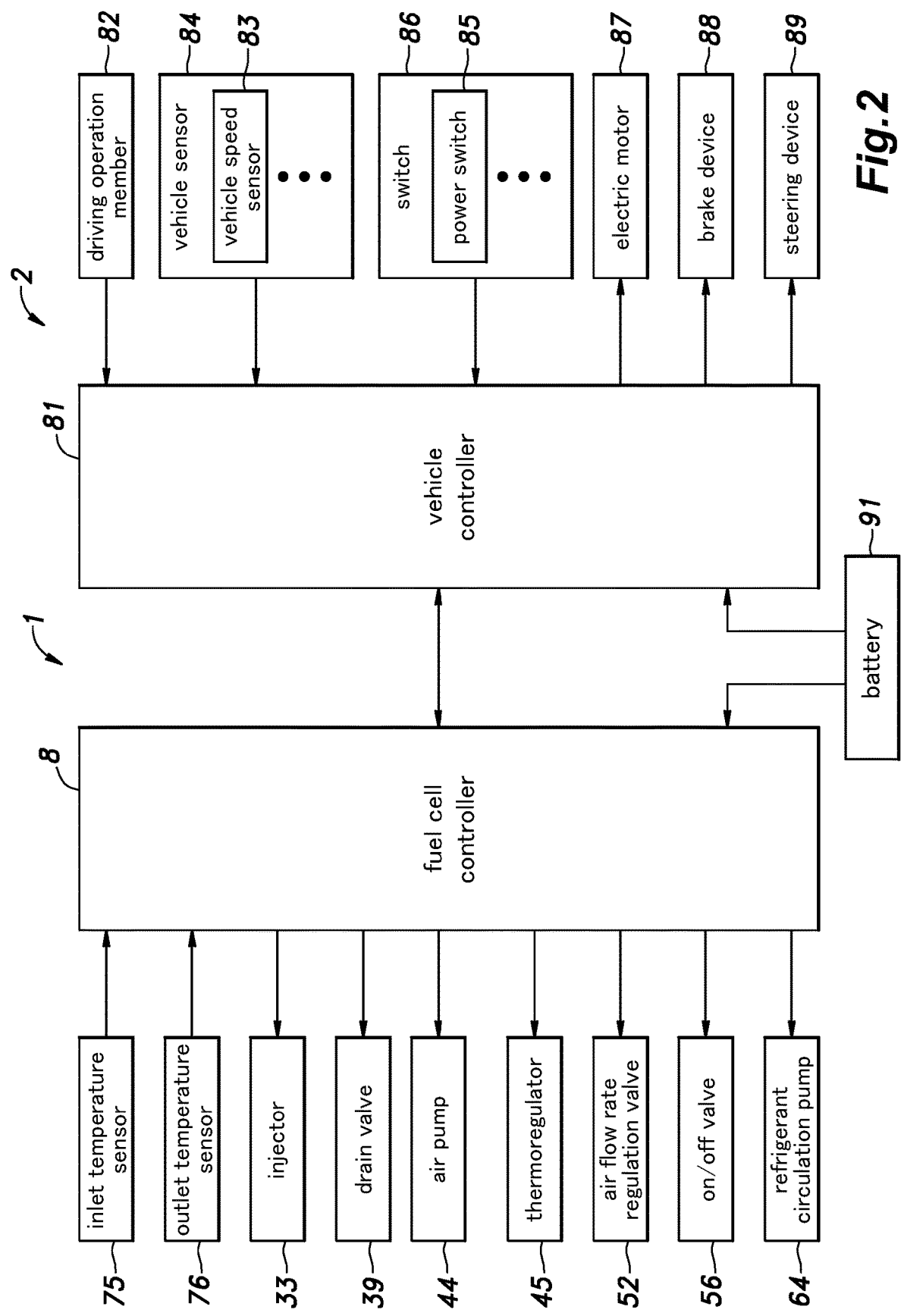
Figure 3:
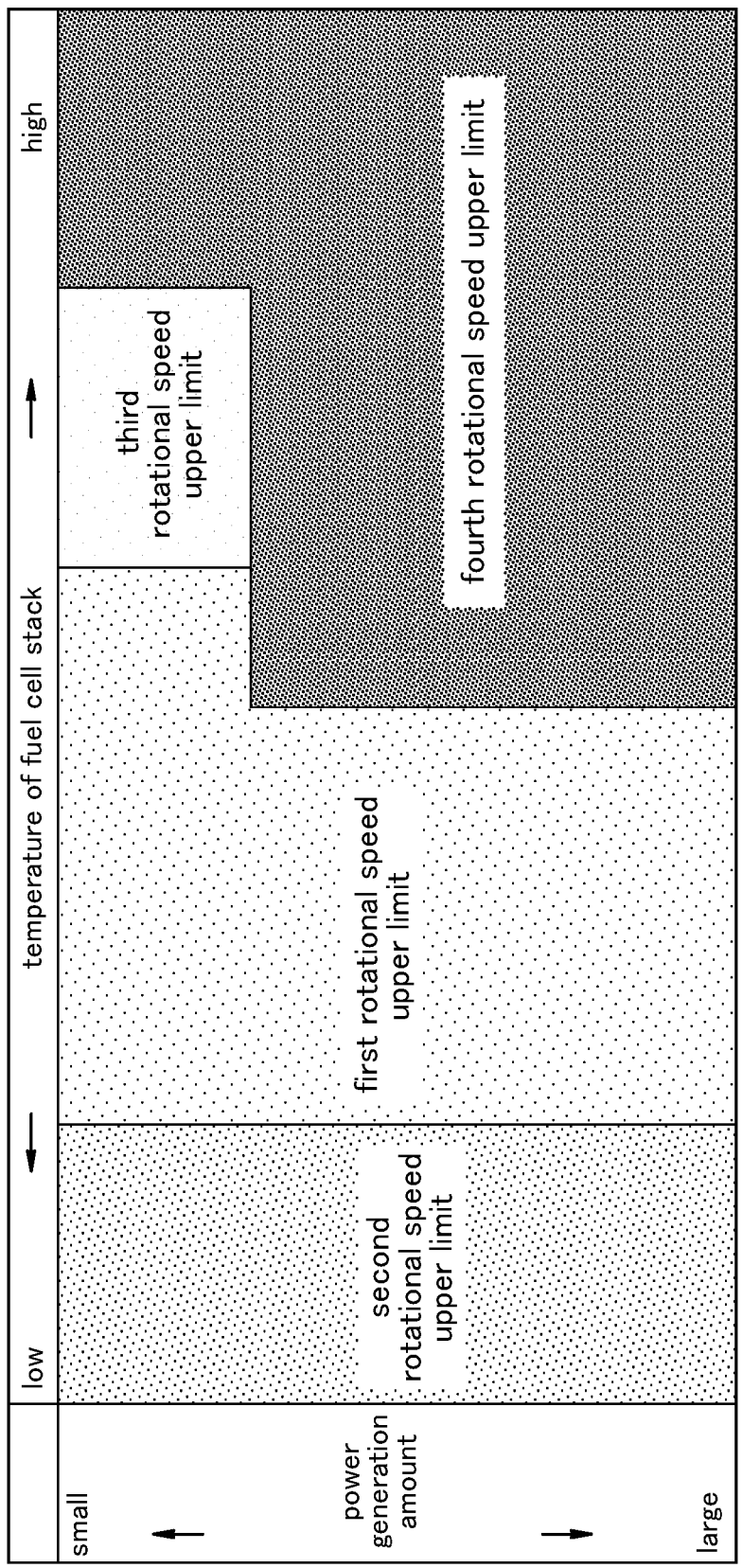
Figure 4:
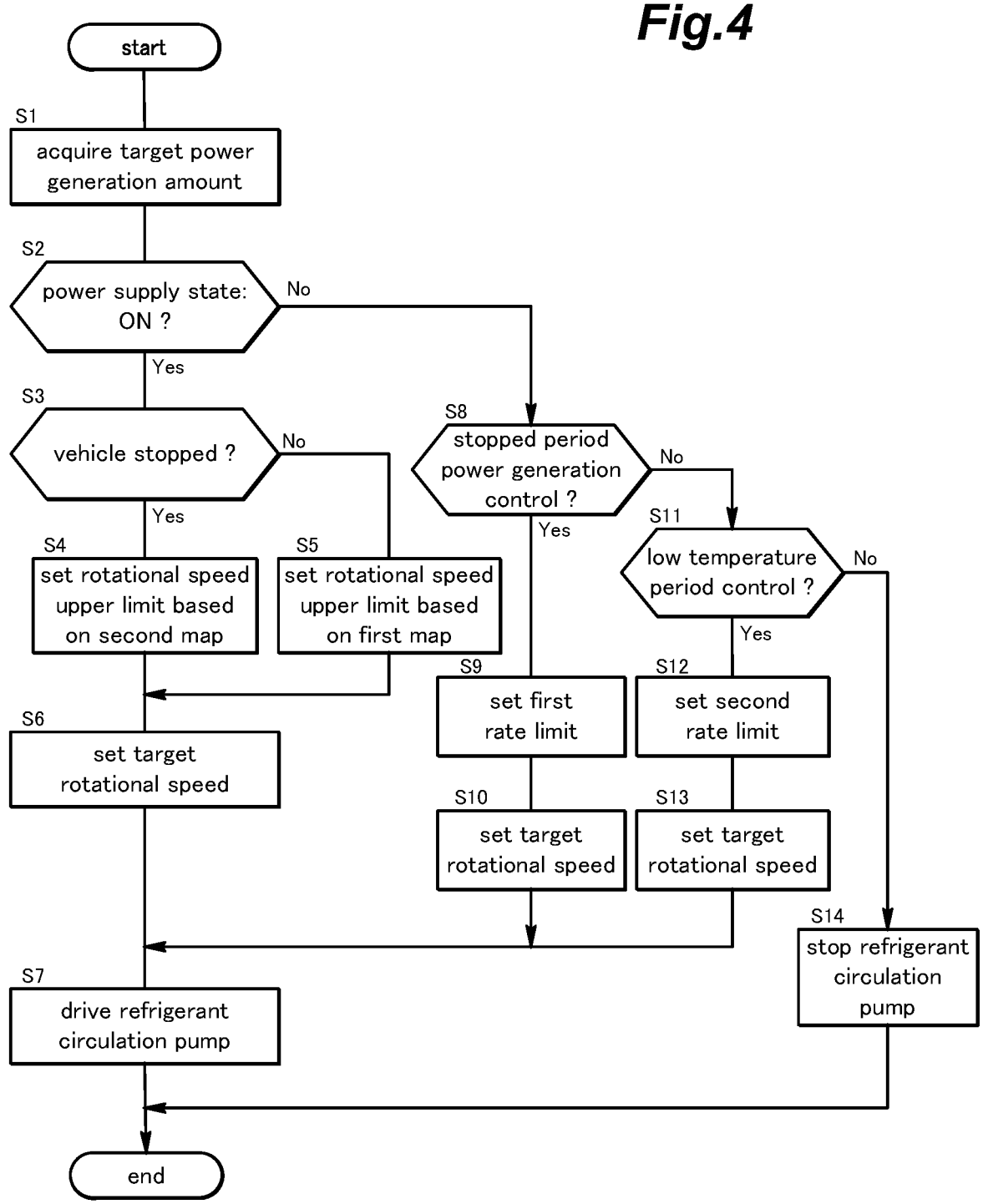

FIG. 1 is a block diagram of a fuel cell system;
FIG. 2 is a block diagram of the fuel cell system;
FIG. 3 is an explanatory diagram showing an example of a second map;
FIG. 4 is a flowchart showing the procedure of refrigerant circulation pump control executed by a fuel cell controller;
FIG. 5A is an explanatory diagram showing a target rotational speed of a refrigerant circulation pump in execution of stopped period power generation control; and
FIG. 5B is an explanatory diagram showing the target rotational speed of the refrigerant circulation pump in execution of low temperature period control.

DETAILED DESCRIPTION OF THE INVENTION

In the following, a fuel cell system 1 according to an embodiment of the present invention will be described. The fuel cell system 1 is mounted on a vehicle 2. As shown in FIG. 1, the fuel cell system 1 includes a fuel cell stack 4, a fuel gas supply device 5 configured to supply a fuel gas to the fuel cell stack 4, an oxidizer gas supply device 6 configured to supply an oxidizer gas to the fuel cell stack 4, a refrigerant supply device 7 configured to supply a refrigerant to the fuel cell stack 4, and a fuel cell controller 8. In the present embodiment, the fuel gas is a hydrogen gas, and the oxidizer gas is air.

The fuel cell stack 4 includes a plurality of power generation cells 10 stacked one by one. Each power generation cell 10 includes an electrolyte membrane and electrode structure 11 (hereinafter simply referred to as "structure 11"), and a first separator 12 and a second separator 13 configured to hold the structure 11 therebetween. The first separator 12 and the second separator 13 may be made of metal or carbon.

The structure 11 includes a solid polymer electrolyte membrane 15 (hereinafter simply referred to as "electrolyte membrane 15"), and an anode 16 (electrode) and a cathode 17 (electrode) configured to hold the electrolyte membrane 15 therebetween. The electrolyte membrane 15 may consist of a thin membrane of a fluorine-based electrolyte such as perfluorosulfonic acid containing moisture. Alternatively, the electrolyte membrane 15 may consist of a thin membrane of a hydrocarbon-based electrolyte.

Between the first separator 12 and the structure 11, a plurality of hydrogen gas passages 21 for supplying the hydrogen gas to the anode 16 is formed. Between the second separator 13 and the structure 11, a plurality of air passages 22 for supplying the air to the cathode 17 is formed. Between the first separator 12 and the second separator 13 adjacent to each other, a plurality of refrigerant passages 23 through which the refrigerant passes is formed.

The fuel cell stack 4 is provided with a hydrogen gas inlet 24, a hydrogen gas outlet 25, an air inlet 26, an air outlet 27, a refrigerant inlet 28, and a refrigerant outlet 29. The hydrogen gas inlet 24 is connected to a supply side (a side to which the hydrogen gas is supplied) of each hydrogen gas passage 21. The hydrogen gas outlet 25 is connected to a discharge side (a side from which the hydrogen gas is discharged) of each hydrogen gas passage 21. The air inlet 26 is connected to a supply side (a side to which the air is supplied) of each air passage 22. The air outlet 27 is connected to a discharge side (a side from which the air is discharged) of each air passage 22. The refrigerant inlet 28 is connected to a supply side (a side to which the refrigerant is supplied) of each refrigerant passage 23. The refrigerant outlet 29 is connected to a discharge side (a side from which the refrigerant is discharged) of each refrigerant passage 23.

The fuel gas supply device 5 includes a hydrogen tank 31 configured to store a high-pressure hydrogen gas. The hydrogen tank 31 is connected to the hydrogen gas inlet 24 of the fuel cell stack 4 via a hydrogen gas supply passage 32. The hydrogen gas supply passage 32 is provided with an injector 33 and an ejector 34 that are arranged in series. When the pressure inside the ejector 34 becomes negative, the ejector 34 sucks the hydrogen gas from a hydrogen gas discharge passage 35.

To the hydrogen gas outlet 25 of the fuel cell stack 4, the hydrogen gas discharge passage 35 is connected. The hydrogen gas discharge passage 35 is configured to discharge an anode off-gas (discharge hydrogen gas), which is the hydrogen gas at least partially used in the anode 16, from the fuel cell stack 4. The hydrogen gas discharge passage 35 is connected to the ejector 34.

The hydrogen gas discharge passage 35 is provided with a gas-liquid separation device 37. The gas-liquid separation device 37 is configured to separate a liquid from the anode off-gas and discharge the separated liquid to a drain passage 38. The drain passage 38 is provided with a drain valve 39. The gas separated by the gas-liquid separation device 37 is sucked into the ejector 34 via the hydrogen gas discharge passage 35.

The oxidizer gas supply device 6 is provided with an air supply passage 41. At one end of the air supply passage 41, an air intake port 42 for introducing air from the atmosphere (outside) is provided. The other end of the air supply passage 41 is connected to the air inlet 26 of the fuel cell stack 4. The air supply passage 41 is provided with an air pump 44, a thermoregulator 45, and a humidifier 46 that are arranged in series and in order of the air pump 44, the thermoregulator 45, and the humidifier 46 from a side of the air intake port 42. The air pump 44 consists of a compressor driven by an electric motor. The thermoregulator 45 may consist of a heater including a heating wire.

To the air outlet 27 of the fuel cell stack 4, an air discharge passage 48 is connected. The air discharge passage 48 is configured to discharge a cathode off-gas, which is compressed air at least partly used in the cathode 17, from the fuel cell stack 4.

The air discharge passage 48 is provided with the humidifier 46. In the humidifier 46, the compressed air supplied from the air pump 44 and the cathode off-gas exchange moisture and heat. The cathode off-gas discharged from the fuel cell stack 4 has a higher temperature and higher humidity than the compressed air passing through the air supply passage 41. Accordingly, the temperature and humidity of the compressed air supplied from the air pump 44 increase in the humidifier 46. The humidifier 46 may consist of a membrane filter humidifier using a hollow fiber membrane. The humidifier 46 may be provided with one passage through which the compressed air passes and another passage through which the cathode off-gas passes, and these two passages may be separated by the hollow fiber membrane.

A portion of the air supply passage 41 between the thermoregulator 45 and the humidifier 46 and a portion of the air discharge passage 48 on a downstream side of the humidifier 46 are connected via an air bypass passage 51. The air bypass passage 51 is provided with an air flow rate regulation valve 52 configured to regulate a flow rate of the air flowing through the air bypass passage 51. To a downstream portion of the air discharge passage 48, the drain passage 38 is connected. An outlet of the air discharge passage 48 is configured to discharge the cathode off-gas and the liquid separated from the anode off-gas to the outside.

A portion of the hydrogen gas discharge passage 35 between the gas-liquid separation device 37 and the ejector 34 and a portion of the air supply passage 41 between the humidifier 46 and the air inlet 26 are connected via an anode off-gas intake passage 55. The anode off-gas intake passage 55 is provided with an on/off valve 56. The anode off-gas intake passage 55 is configured to supply the anode off-gas to the air supply passage 41.

The refrigerant supply device 7 includes a refrigerant supply passage 61 connected to the refrigerant inlet 28 of the fuel cell stack 4, a refrigerant discharge passage 62 connected to the refrigerant outlet 29 of the fuel cell stack 4, and a radiator 63 connected to the refrigerant supply passage 61 and the refrigerant discharge passage 62. The refrigerant supply passage 61 is provided with a refrigerant circulation pump 64 configured to circulate the refrigerant. The refrigerant supply passage 61, the refrigerant discharge passage 62, and the radiator 63 constitute a refrigerant circulation passage 65 through which the refrigerant circulates. The refrigerant circulation passage 65 is connected to the fuel cell stack 4.

In a portion of the refrigerant supply passage 61 between the radiator 63 and the refrigerant circulation pump 64, a thermostat valve 67 is provided. The thermostat valve 67 is opened when the refrigerant flowing through the refrigerant supply passage 61 is at a relatively high temperature, and is closed when the refrigerant flowing therethrough is at a relatively low temperature. The refrigerant discharge passage 62 and the refrigerant supply passage 61 are connected via a refrigerant bypass passage 68 that bypasses the radiator 63 and the thermostat valve 67. The refrigerant bypass passage 68 is connected to a portion of the refrigerant supply passage 61 between the thermostat valve 67 and the refrigerant circulation pump 64. When the thermostat valve 67 is closed, the refrigerant flows from the refrigerant discharge passage 62 to the refrigerant supply passage 61 via the refrigerant bypass passage 68.

To a portion of the refrigerant supply passage 61 between the thermostat valve 67 and the refrigerant circulation pump 64, a reserve tank 72 is connected via a regulation valve 71. More specifically, the reserve tank 72 may be connected, via the regulation valve 71, to a portion of the refrigerant supply passage 61 between a portion connected to the refrigerant bypass passage 68 and the refrigerant circulation pump 64. Hereinafter, the pressure of the refrigerant at a portion of the refrigerant supply passage 61 connected to an inlet of the refrigerant circulation pump 64 will be referred to as "pump inlet pressure". The regulation valve 71 is opened when the pump inlet pressure becomes equal to or lower than a prescribed first pressure. Accordingly, the refrigerant is supplied from the reserve tank 72 to the refrigerant supply passage 61. Also, the regulation valve 71 is opened when the pump inlet pressure becomes equal to or higher than a prescribed second pressure that is higher than the first pressure. Accordingly, the refrigerant is discharged from the refrigerant supply passage 61 to the reserve tank 72.

The refrigerant supply passage 61 and the refrigerant discharge passage 62 are made of resin or rubber to prevent the elution of metal ions into cooling water and to maintain the insulation of the refrigerant.

A portion of the refrigerant supply passage 61 between the refrigerant inlet 28 and the refrigerant circulation pump 64 is provided with an inlet temperature sensor 75 configured to detect a temperature of the refrigerant. The inlet temperature sensor 75 is configured to detect the temperature of the refrigerant flowing into the refrigerant inlet 28. A portion of the refrigerant discharge passage 62 between the refrigerant outlet 29 and the refrigerant bypass passage 68 is provided with an outlet temperature sensor 76 configured to detect the temperature of the refrigerant. The outlet temperature sensor 76 is configured to detect the temperature of the refrigerant flowing out of the refrigerant outlet 29. The inlet temperature sensor 75 and the outlet temperature sensor 76 function as a temperature acquiring unit configured to acquire a temperature of the fuel cell stack 4.

The fuel cell controller 8 consists of an electronic control unit (ECU) including a CPU, non-volatile memory (read-only memory: ROM), volatile memory (random-access memory: RAM), and the like. As shown in FIG. 2, the fuel cell controller 8 is configured to control the air pump 44, the injector 33, the refrigerant circulation pump 64, the on/off valve 56, the drain valve 39, the air flow rate regulation valve 52, and the thermoregulator 45.

The fuel cell controller 8 is connected to a vehicle controller 81 configured to control traveling of the vehicle 2. Like the fuel cell controller 8, the vehicle controller 81 consists of an electronic control unit (ECU) including a CPU, non-volatile memory, volatile memory, and the like. The vehicle controller 81 is configured to control an electric motor 87 as a drive source, a brake device 88, and a steering device 89 based on signals from a driving operation member 82 such as an accelerator pedal, a brake pedal, and a steering wheel, a vehicle sensor 84 such as a vehicle speed sensor 83 and a temperature sensor, and a switch 86 such as a power switch 85 (ignition switch). The fuel cell controller 8 and the vehicle controller 81 may be formed integrally. The fuel cell controller 8 and the vehicle controller 81 are connected to a battery 91.

The power switch 85 is turned on and off by a user. The vehicle controller 81 switches a power supply state of the vehicle 2 based on signals from the power switch 85. More specifically, when the power switch 85 is turned on, the vehicle controller 81 sets the power supply state to "ON", thereby enabling the power supply from the fuel cell stack 4 and the battery 91 to the electric motor 87. On the other hand, when the power switch 85 is turned off, the vehicle controller 81 sets the power supply state to "OFF", thereby prohibiting the power supply from the fuel cell stack 4 and the battery 91 to the electric motor 87.

The vehicle speed sensor 83 is a sensor configured to acquire a vehicle speed of the vehicle 2. The vehicle speed sensor 83 may consist of, for example, a sensor configured to detect a rotational speed of a wheel or a sensor configured to detect a rotational speed of the electric motor 87.

The vehicle controller 81 is configured to determine a request driving force of the vehicle 2 (more specifically, the electric motor 87) and control the electric motor 87 based on the request driving force. For example, the vehicle controller 81 may determine the request driving force based on a pressing amount of the accelerator pedal. Further, the vehicle controller 81 may determine the request driving force based on both the pressing amount of the accelerator pedal and the vehicle speed. Alternatively, the vehicle controller 81 may be configured to execute autonomous driving control and determine the request driving force based on the action plan created therefor.

The fuel cell controller 8 receives information on the request driving force, the power supply state, and the vehicle speed from the vehicle controller 81. Further, the fuel cell controller 8 is connected to the inlet temperature sensor 75 and the outlet temperature sensor 76 and configured to receive signals relating to the temperature of the refrigerant from the inlet temperature sensor 75 and the outlet temperature sensor 76.

The fuel cell controller 8 is configured to execute traveling period power generation control to supply power (electric power) required for causing the vehicle 2 to travel. In the traveling period power generation control, the fuel cell controller 8 determines a target power generation amount of the fuel cell stack 4 based on the request driving force. The relationship between the request driving force and the target power generation amount of the fuel cell stack 4 may be defined by a map. Further, the fuel cell controller 8 determines an opening degree of the injector 33 and a driving amount of the air pump 44 based on the target power generation amount. The relationships between the target power generation amount and the opening degree of the injector 33 and between the target power generation amount and the driving amount of the air pump 44 may be defined by a map. The fuel cell controller 8 controls the injector 33 and the air pump 44 based on the opening degree of the injector 33 and the driving amount of the air pump 44, and thus supplies the hydrogen gas and the air to the fuel cell stack 4. Accordingly, a redox reaction occurs in the fuel cell stack 4, and thus the power is generated by the fuel cell stack 4. By the traveling period power generation control executed by the fuel cell controller 8, the fuel cell stack 4 changes the power generation amount according to the request driving force of the vehicle 2.

When the vehicle 2 is stopped and a remaining amount of the battery 91 is equal to or less than a prescribed value, the fuel cell controller 8 executes stopped period power generation control to charge the battery 91. More specifically, when the vehicle speed is equal to or lower than a stop determination value and an SOC of the battery 91 is equal to or less than a prescribed SOC determination value, the fuel cell controller 8 executes the stopped period power generation control. The stop determination value is set to a vehicle speed at which the vehicle 2 can be regarded as being stopped. The SOC determination value is a value set for determining that the battery 91 needs to be charged. In the stopped period power generation control, the fuel cell controller 8 sets a prescribed target power generation amount, and determines the opening degree of the injector 33 and the driving amount of the air pump 44 based on the target power generation amount. The fuel cell controller 8 controls the injector 33 and the air pump 44 based on the opening degree of the injector 33 and the driving amount of the air pump 44, and thus supplies the hydrogen gas and the air to the fuel cell stack 4. Accordingly, a redox reaction occurs in the fuel cell stack 4, and thus the power is generated by the fuel cell stack 4.

The fuel cell controller 8 controls the refrigerant circulation pump 64 based on the temperature of the fuel cell stack 4 and the target power generation amount. The fuel cell controller 8 may estimate the temperature of the fuel cell stack 4 based on at least one of the temperature (hereinafter referred to as "refrigerant inlet temperature") of the refrigerant at the refrigerant inlet 28 detected by the inlet temperature sensor 75 and the temperature (hereinafter referred to as "refrigerant outlet temperature") of the refrigerant at the refrigerant outlet 29 detected by the outlet temperature sensor 76. For example, the fuel cell controller 8 may estimate the temperature of the fuel cell stack 4 by using a map that defines the relationship between the refrigerant outlet temperature and the fuel cell stack 4. Alternatively, the fuel cell controller 8 may estimate the temperature of the fuel cell stack 4 by using a map that defines the relationship between the fuel cell stack 4 and the difference between the refrigerant inlet temperature and the refrigerant outlet temperature. In another embodiment, the fuel cell stack 4 may be provided with a temperature sensor configured to directly acquire the temperature of the fuel cell stack 4.

The fuel cell controller 8 sets a rotational speed upper limit (rpm) of the refrigerant circulation pump 64 based on the temperature of the fuel cell stack 4 and the target power generation amount. The relationship between the temperature of the fuel cell stack 4, the target power generation amount, and the rotational speed upper limit of the refrigerant circulation pump 64 is defined by one or more rotational speed upper limit maps. Preferably, a plurality of rotational speed upper limit maps is set in advance according to various conditions.

In the present embodiment, the fuel cell controller 8 uses a first map (an example of the rotational speed upper limit map) when the vehicle speed is higher than the stop determination value, and uses a second map (an example of the rotational speed upper limit map) when the vehicle speed is equal to or lower than the stop determination value. The first map and the second map are set such that the rotational speed upper limit of the refrigerant circulation pump 64 increases as the target power generation amount increases and the rotational speed upper limit of the refrigerant circulation pump 64 increases as the temperature of the fuel cell stack 4 increases.

The rotational speed upper limit set based on the second map is equal to or lower than the rotational speed upper limit set based on the first map. That is, when the rotational speed upper limit is set by using the second map, the rotational speed upper limit is suppressed (set lower) as compared with a case where the rotational speed upper limit is set by using the first map.

Further, the second map is set such that the rotational speed upper limit is set lower at a time the power generation amount of the fuel cell stack 4 is equal to or less than a prescribed power generation threshold as compared with a time the power generation amount of the fuel cell stack 4 is more than the power generation threshold in a case where the temperature of the fuel cell stack 4 is equal to or higher than a prescribed temperature threshold. Accordingly, the rotational speed upper limit is set lower in a case where the power generation amount is relatively small as compared with a case where the power generation amount is relatively large even if the temperature of the fuel cell stack 4 in the above two cases is the same.

FIG. 3 shows an example of the second map. In FIG. 3, a third rotational speed upper limit is set higher than a first rotational speed upper limit, and a fourth rotational speed upper limit is set higher than the third rotational speed upper limit. As can be understood by the relationship between the fourth rotational speed upper limit and the third rotational speed upper limit, the rotational speed upper limit is set lower in a case where the power generation amount of the fuel cell stack 4 is relatively small as compared with a case where the power generation amount thereof is relatively large even if the temperature of the fuel cell stack 4 in the above two cases is the same. The second rotational speed upper limit may be set at any value. For example, the second rotational speed upper limit may be set higher than the third rotational speed upper limit and lower than the fourth rotational speed upper limit.

The fuel cell controller 8 sets the rotational speed of the refrigerant circulation pump 64 within a range equal to or lower than the rotational speed upper limit based on the temperature of the fuel cell stack 4. For example, the fuel cell controller 8 acquires the rotational speed of the refrigerant circulation pump 64 as a provisional rotational speed based on the temperature of the fuel cell stack 4 by using a map that defines the relationship between the temperature of the fuel cell stack 4 and the rotational speed of the refrigerant circulation pump 64. Then, the fuel cell controller 8 may set the provisional rotational speed as the target rotational speed in a case where the provisional rotational speed is equal to or lower than the rotational speed upper limit, and set the rotational speed upper limit as the target rotational speed in a case where the provisional rotational speed is higher than the rotational speed upper limit.

The fuel cell controller 8 controls the power supplied to the refrigerant circulation pump 64 based on the set target rotational speed, thereby driving the refrigerant circulation pump 64 at the target rotational speed.

When the vehicle 2 is stopped and the temperature of the fuel cell stack 4 is equal to or lower than a prescribed low temperature threshold, the fuel cell controller 8 executes low temperature period control to drive the refrigerant circulation pump 64 at a prescribed low temperature period rotational speed. The refrigerant is supplied to the fuel cell stack 4 according to the low temperature period control executed by the fuel cell controller 8, and thus the refrigerant causes the temperature of the fuel cell stack 4 to increase. Accordingly, the fuel cell stack 4 is prevented from freezing.

Next, the procedure of refrigerant circulation pump control executed by the fuel cell controller 8 will be described with reference to FIG. 4. The fuel cell controller 8 executes the refrigerant circulation pump control at prescribed time intervals. First, the fuel cell controller 8 acquires the target power generation amount (S1). As described above, the target power generation amount is calculated (determined) when the fuel cell controller 8 executes the traveling period power generation control or the stopped period power generation control.

Next, the fuel cell controller 8 determines whether the power supply state is "ON" based on the information on the power supply state acquired from the vehicle controller 81 (S2).

In a case where the power supply state is "ON" (in a case where the determination result of S2 is Yes), the fuel cell controller 8 determines whether the vehicle 2 is stopped (S3). The fuel cell controller 8 may determine that the vehicle 2 is stopped in a case where the vehicle speed is equal to or lower than the stop determination value.

In a case where the vehicle 2 is stopped (in a case where the determination result of S3 is Yes), the fuel cell controller 8 sets the rotational speed upper limit of the refrigerant circulation pump 64 based on the temperature of the fuel cell stack 4 and the target power generation amount by using the second map (S4).

In a case where the vehicle 2 is not stopped (in a case where the determination result of S3 is No), the fuel cell controller 8 sets the rotational speed upper limit of the refrigerant circulation pump 64 based on the temperature of the fuel cell stack 4 and the target power generation amount by using the first map (S5).

After setting the rotational speed upper limit of the refrigerant circulation pump 64 in step S4 or S5, the fuel cell controller 8 sets the target rotational speed of the refrigerant circulation pump 64 based on the temperature of the fuel cell stack 4 and the rotational speed upper limit of the refrigerant circulation pump 64 (S6). Then, the fuel cell controller 8 drives (controls) the refrigerant circulation pump 64 based on the target rotational speed of the refrigerant circulation pump 64 (S7).

In a case where the power supply state is not "ON" (in a case where the determination result of S2 is No), the fuel cell controller 8 determines whether the stopped period power generation control is being executed (S8). In a case where the stopped period power generation control is being executed (in a case where the determination result of S8 is Yes), the fuel cell controller 8 sets a first rate limit to suppress the changing amount per unit time of the target rotational speed of the refrigerant circulation pump 64 (S9). The first rate limit is set as an acceptable changing amount per unit time of the target rotational speed of the refrigerant circulation pump 64. Subsequently, the fuel cell controller 8 sets the target rotational speed of the refrigerant circulation pump 64 based on a base rotational speed of the refrigerant circulation pump 64 in the stopped period power generation control and the first rate limit (S10). The base rotational speed of the refrigerant circulation pump 64 in the stopped period power generation control may be set based on a prescribed map. In the map, the base rotational speed may be set according to the elapsed time from the start of the stopped period power generation control. The target rotational speed may be set based on the base rotational speed such that the changing amount per unit time becomes equal to or less than the first rate limit. Accordingly, as shown in FIG. 5A, the rapid increase in the target rotational speed is suppressed. After setting the target rotational speed of the refrigerant circulation pump 64 in step S10, the fuel cell controller 8 drives (controls) the refrigerant circulation pump 64 based on the target rotational speed of the refrigerant circulation pump 64 (S7).

In a case where the stopped period power generation control is not being executed (in a case where the determination result of S8 is No), the fuel cell controller 8 determines whether the low temperature period control is being executed (S11). In a case where the low temperature period control is executed (in a case where the determination result of S11 is Yes), the fuel cell controller 8 sets a second rate limit to suppress the changing amount per unit time of the target rotational speed of the refrigerant circulation pump 64 (S12). The second rate limit is set as an acceptable changing amount per unit time of the target rotational speed of the refrigerant circulation pump 64. The second rate limit may be equal to or different from the first rate limit. Subsequently, the fuel cell controller 8 sets the target rotational speed of the refrigerant circulation pump 64 based on a base rotational speed of the refrigerant circulation pump 64 in the low temperature period control and the second rate limit (S13). The base rotational speed of the refrigerant circulation pump 64 in the low temperature period control may be set based on a prescribed map. In the map, the base rotational speed may be set according to the elapsed time from the start of the low temperature period control. The target rotational speed may be set based on the base rotational speed such that the changing amount per unit time becomes equal to or less than the second rate limit. Accordingly, as shown in FIG. 5B, the rapid increase in the target rotational speed is suppressed. After setting the target rotational speed of the refrigerant circulation pump 64 in step S13, the fuel cell controller 8 drives (controls) the refrigerant circulation pump 64 based on the target rotational speed of the refrigerant circulation pump 64 (S7).

In a case where the low temperature period control is not executed (in a case where the determination result of S11 is No), the fuel cell controller 8 stops the refrigerant circulation pump 64 (S14).

According to the above configuration, in a case where the power supply state is "ON" and the vehicle 2 is traveling, the rotational speed upper limit of the refrigerant circulation pump 64 is set based on the first map. On the other hand, in a case where the power supply state is "ON" and the vehicle 2 is stopped, the rotational speed upper limit of the refrigerant circulation pump 64 is set based on the second map. In the second map, the rotational speed upper limit of the refrigerant circulation pump 64 is set lower as compared with the first map. Accordingly, in a case where the vehicle 2 is stopped, the target rotational speed of the refrigerant circulation pump 64 is set lower as compared with a case where the vehicle 2 is traveling. When the vehicle 2 is stopped (when the vehicle speed is equal to or lower than the stop determination value), it is estimated that the power generation amount of the fuel cell stack 4 decreases, and thus the temperature of the fuel cell stack 4 decreases. Accordingly, even if the rotational speed of the refrigerant circulation pump 64 is suppressed, the temperature of the fuel cell stack 4 is prevented from increasing. Accordingly, it is possible to provide a fuel cell system 1 that can suppress the negative pressure generated at the inlet of the refrigerant circulation pump 64 and stabilize the temperature of the fuel cell stack 4. Since the negative pressure generated at the inlet of the refrigerant circulation pump 64 is suppressed, the deformation of the refrigerant supply passage 61 and the cavitation in the refrigerant circulation pump 64 can be suppressed.

Further, the second map is set such that the rotational speed upper limit is set lower at a time the power generation amount of the fuel cell stack 4 is equal to or less than a prescribed power generation threshold as compared with a time the power generation amount of the fuel cell stack 4 is more than the power generation threshold in a case where the temperature of the fuel cell stack 4 is equal to or higher than a prescribed temperature threshold. Accordingly, the rotational speed upper limit is set lower in a case where the power generation amount is relatively small as compared with a case where the power generation amount is relatively large even if the temperature of the fuel cell stack 4 in the above two cases is the same. When the power generation amount of the fuel cell stack 4 is equal to or less than the power generation threshold, it is estimated that the temperature of the fuel cell stack 4 decreases. Accordingly, even if the rotational speed of the refrigerant circulation pump 64 is suppressed, the temperature of the fuel cell stack 4 is prevented from increasing.

The fuel cell controller 8 sets an upper limit of an increasing speed of the rotational speed of the refrigerant circulation pump 64 lower at the time the vehicle speed is equal to or lower than the stop determination value as compared with the time the vehicle speed is higher than the stop determination value. When the vehicle 2 is stopped, the power generation amount of the fuel cell stack 4 set based on the target driving force decreases. Accordingly, even if the rotational speed of the refrigerant circulation pump 64 is suppressed, the temperature of the fuel cell stack 4 is prevented from increasing.

In a case where the power supply state is "OFF" and the stopped period power generation control or the low temperature period control is being executed, a rate limit (the first rate limit or the second rate limit) is set to suppress the target rotational speed. In a case where the power supply state is "OFF", it is estimated that the power generation amount of the fuel cell stack 4 decreases as compared with a case where the power supply state is "ON", and thus the temperature of the fuel cell stack 4 decreases. Accordingly, even if the increasing speed of the rotational speed of the refrigerant circulation pump 64 is suppressed, the temperature of the fuel cell stack 4 is prevented from increasing. Accordingly, it is possible to provide a fuel cell system 1 that can suppress the negative pressure generated at the inlet of the refrigerant circulation pump 64 and stabilize the temperature of the fuel cell stack 4.

Concrete embodiments of the present invention have been described in the foregoing, but the present invention should not be limited by the foregoing embodiments and various modifications and alterations are possible within the scope of the present invention.

The invention claimed is:

1. A fuel cell system mounted on a vehicle, comprising:
a fuel cell stack;
a refrigerant circulation passage connected to the fuel cell stack, a refrigerant being configured to circulate through the refrigerant circulation passage;
a refrigerant circulation pump arranged in the refrigerant circulation passage and configured to circulate the refrigerant;
a reserve tank connected to the refrigerant circulation passage via a regulation valve;
a vehicle speed sensor configured to acquire a vehicle speed of the vehicle;
a temperature acquiring unit configured to acquire a temperature of the fuel cell stack; and
a controller configured to control a power generation amount of the fuel cell stack according to a request driving force of the vehicle and control the refrigerant circulation pump,
wherein the controller is configured to set a rotational speed of the refrigerant circulation pump within a range equal to or lower than a rotational speed upper limit based on the temperature of the fuel cell stack,
the controller sets the rotational speed upper limit lower at a time the vehicle speed is equal to or lower than a stop determination value as compared with a time the vehicle speed is higher than the stop determination value, the stop determination value being set to the vehicle speed at which the vehicle can be regarded as being stopped,
in a case where the vehicle speed is equal to or lower than the stop determination value and the temperature of the fuel cell stack is equal to or higher than a first temperature threshold and is lower than a second temperature threshold which is higher than the first temperature threshold, the controller sets the rotational speed upper limit lower at a time the power generation amount of the fuel cell stack is equal to or less than a prescribed power generation threshold as compared with a time the power generation amount of the fuel cell stack is more than the power generation threshold,
in a case where the vehicle speed is equal to or lower than the stop determination value, the temperature of the fuel cell stack is equal to or higher than the second temperature threshold, and the power generation amount of the fuel cell stack is equal to or less than the power generation threshold, the controller sets the rotational speed upper limit higher as compared with a time the vehicle speed is equal to or lower than the stop determination value, the temperature of the fuel cell stack is equal to or higher than the first temperature threshold and is lower than the second temperature threshold, and the power generation amount of the fuel cell stack is equal to or less than the power generation threshold, and in a case where the vehicle speed is equal to or lower than the stop determination value, the temperature of the fuel cell stack is equal to or higher than the second temperature threshold, and the power generation amount of the fuel cell stack is equal to or less than the power generation threshold, the controller sets the rotational speed upper limit to the same value as the rotational speed upper limit when the vehicle speed is equal to or lower than the stop determination value, the temperature of the fuel cell stack is equal to or higher than the second temperature threshold, and the power generation amount of the fuel cell stack is more than the power generation threshold.

2. The fuel cell system according to claim 1, wherein the controller sets an upper limit of an increasing speed of the rotational speed of the refrigerant circulation pump lower at the time the vehicle speed is equal to or lower than the stop determination value as compared with the time the vehicle speed is higher than the stop determination value.

3. The fuel cell system according to claim 1, wherein in a case where the fuel cell stack stops power generation and the temperature of the fuel cell stack is equal to or lower than a prescribed low temperature threshold, the controller executes low temperature period control to drive the refrigerant circulation pump at a prescribed low temperature period rotational speed, and in the low temperature period control, the controller sets an increasing speed of the rotational speed of the refrigerant circulation pump lower than an upper limit of the increasing speed of the rotational speed of the refrigerant circulation pump at the time the vehicle speed is higher than the stop determination value.

* * * * *